United States Patent [19]
Liu

[11] Patent Number: 5,189,982
[45] Date of Patent: Mar. 2, 1993

[54] TABLE WITH DECORATIVE AQUARIUM AND LIGHT REFRACTIVE EFFECT

[76] Inventor: Chin S. Liu, No. 8, Lane 244, Swc. 5, Yen-Ping N. Rd., Taipei, Taiwan

[21] Appl. No.: 884,764

[22] Filed: May 18, 1992

[51] Int. Cl.$^5$ ............................................. A01K 63/00
[52] U.S. Cl. ........................................ 119/5; 362/101; 362/127
[58] Field of Search ............... 119/3, 4, 5; 362/31, 362/101, 127; D30/101, 102, 103, 104, 105, 106

[56] References Cited

U.S. PATENT DOCUMENTS

| | | | |
|---|---|---|---|
| 3,185,829 | 5/1965 | Rau | 362/101 X |
| 3,269,578 | 8/1966 | Lewis | 362/101 X |
| 4,147,131 | 4/1979 | Walker | 119/5 |

Primary Examiner—Gene Mancene
Assistant Examiner—Thomas Price
Attorney, Agent, or Firm—Bacon & Thomas

[57] ABSTRACT

A table with decorative aquarium, including a plurality of lighting fixtures and a base with a plurality of hollow supporters to fit a plurality of equidistant transparent legs arranged annularly to support a polygonal top, and a plurality of equidistant transparent supports arranged annularly to support a transparent aquarium located below the top within a zone surrounded by the legs so that lights of same or different colors from the lighting fixtures are refracted by the legs and supports and then projected to the top and aquarium.

2 Claims, 3 Drawing Sheets

TABLE WITH DECORATIVE AQUARIUM AND LIGHT REFRACTIVE EFFECT

BACKGROUND OF THE INVENTION

The present invention relates to a table with aquarium and light refractive effect, particularly a table with lights reflected from scales of fishes swimming in an aquarium to provide a wonderful environment with lights reflected from fishes swimming in the aquarium, and a table to provide a wondering light refraction effect.

Following the progress of sciences and technologies in a prosperous world today, living quality is being upgraded rapidly. Besides quantity and quality of food, dining environment is stressed in modern living.

Generally, indoor decoration is a way to create a good dining environment at home or restaurant. However, table is always the focus of people at dinner, but there is no particular dining table which can provide good dining environment, for up to now the dining table manufacturers are lay stress on material and style of dinning tables without taking dining environment into consideration.

SUMMARY OF THE INVENTION

The main object of the present invention is to provide a dining table with decorative aquarium and light refraction effect to create an interesting and wonderful dining environment.

Another object of the present invention is to provide a dining table with decorative aquarium and light refraction effect which is practical, and easy to produce at low production cost.

The table according to the present invention includes a plurality of lighting fixtures and a base with a plurality of hollow supporters to fit a plurality of equidistant transparent legs arranged annularly to support a polygonal top, and a plurality of equidistant transparent supports arranged annularly to support a transparent aquarium located below the top within a zone surrounded by the legs so that lights of same or different colors from the lighting fixtures are refracted by the legs and supports and then projected to the top and aquarium, and lights can be then reflected from scales of fishes swimming in the aquarium to provide an interesting and wonderful dining environment with a variety of colorful lights.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
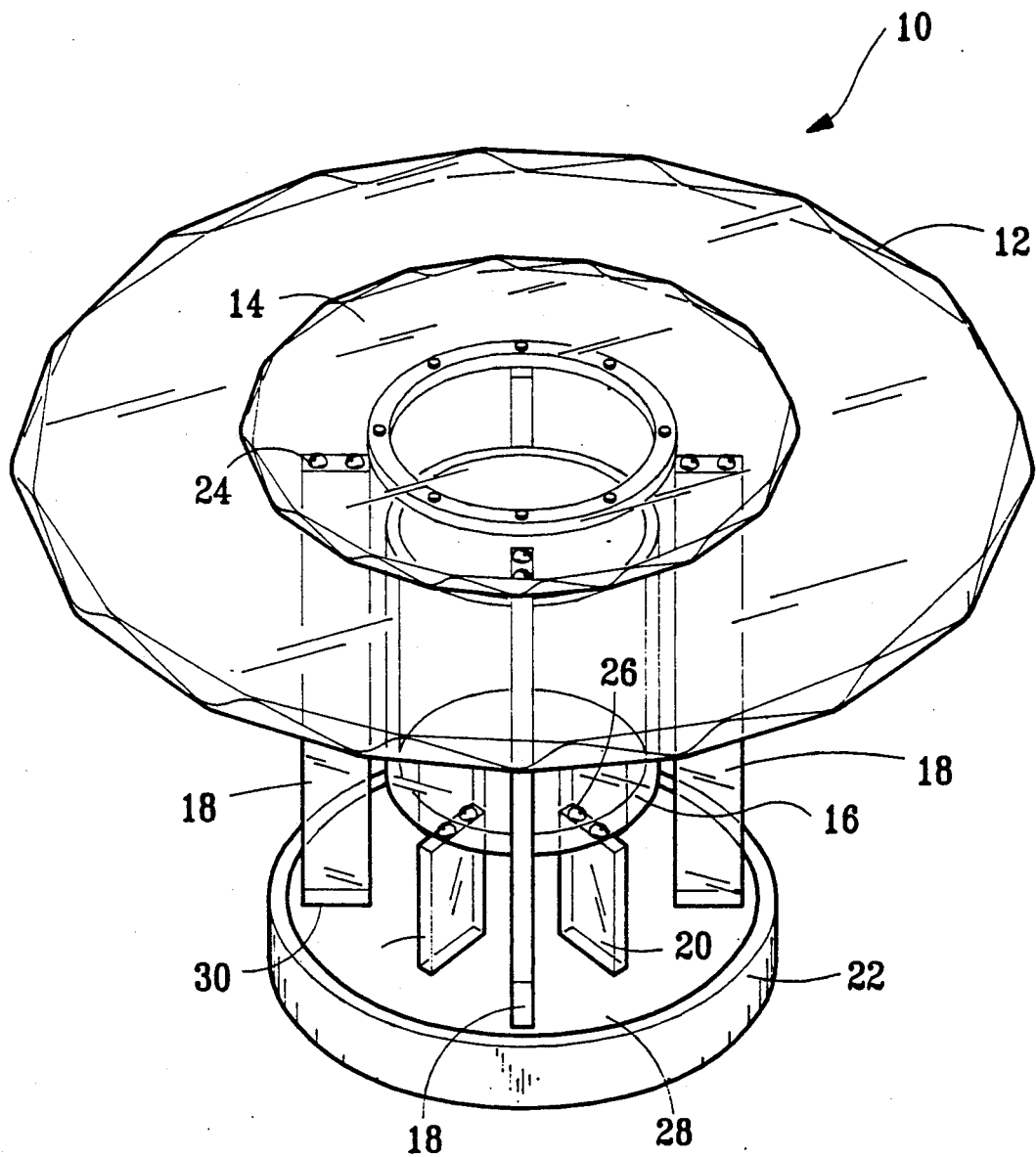
FIG. 1 is a perspective view of a table with aquarium and light refractive effect according to the present invention.
Figure 2:
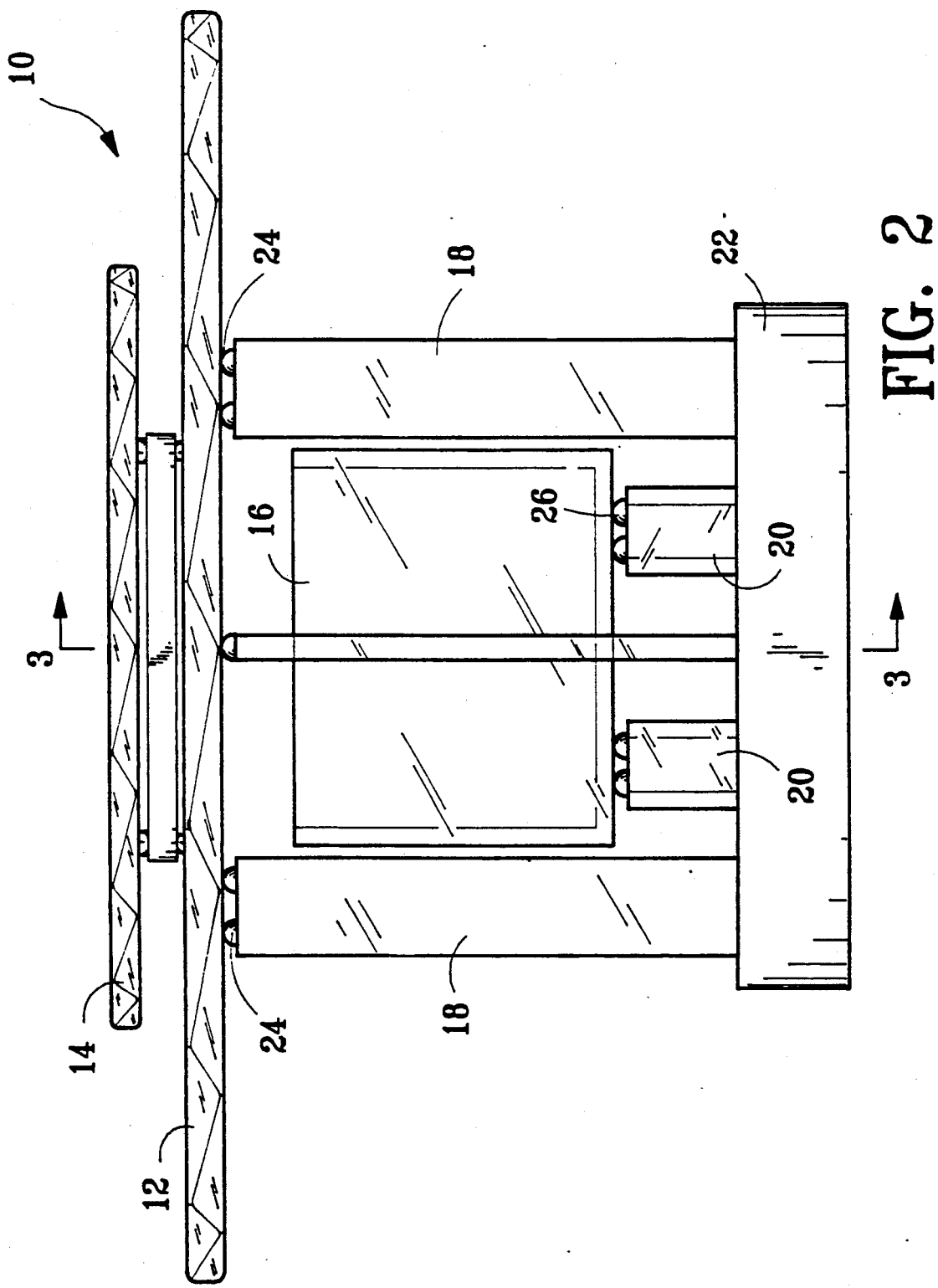
FIG. 2 is a cross-section of the table according to the present invention.

Please refer to FIGS. 1 and 2, the table with aquarium and light refractive effect (10) according to the present invention comprises mainly a polygonal top (12), a polygonal rotating stand (14), a polygonal rotating stand (14), a cylindrical transparent aquarium (16), a plurality of transparent legs (18) to support the top (12), and a plurality of transparent supports (20) to support the aquarium (16). The legs (18) and the supports (20) are firmly fixed to a nontransparent base (22). In other words, the base (22) serves to support all the main components described above.

The legs (18) and the supports (20) are arranged annularly at equal intervals in a manner that the legs (18) and the supports (20) are located alternately and symmetrically. The aquarium (16) is supported by the supports (20) and suspended beneath the top (12), surrounded by the legs (18). The adequate space is maintained between the aquarium (16) and the top (12) in order to facilitate access to the aquarium for placing of feedstuff and daily maintenance. At least a soft gasket (24 or 26) is on the top surface of each leg (18) or support (20) to prevent from sliding of the top (12) and the aquarium (16) due to lack of friction, and to prevent from scrapping on the top (12) and the aquarium (16) by the legs (18) and the supports (20) in order to maintain the top (12) in nice appearance.

Figure 3:
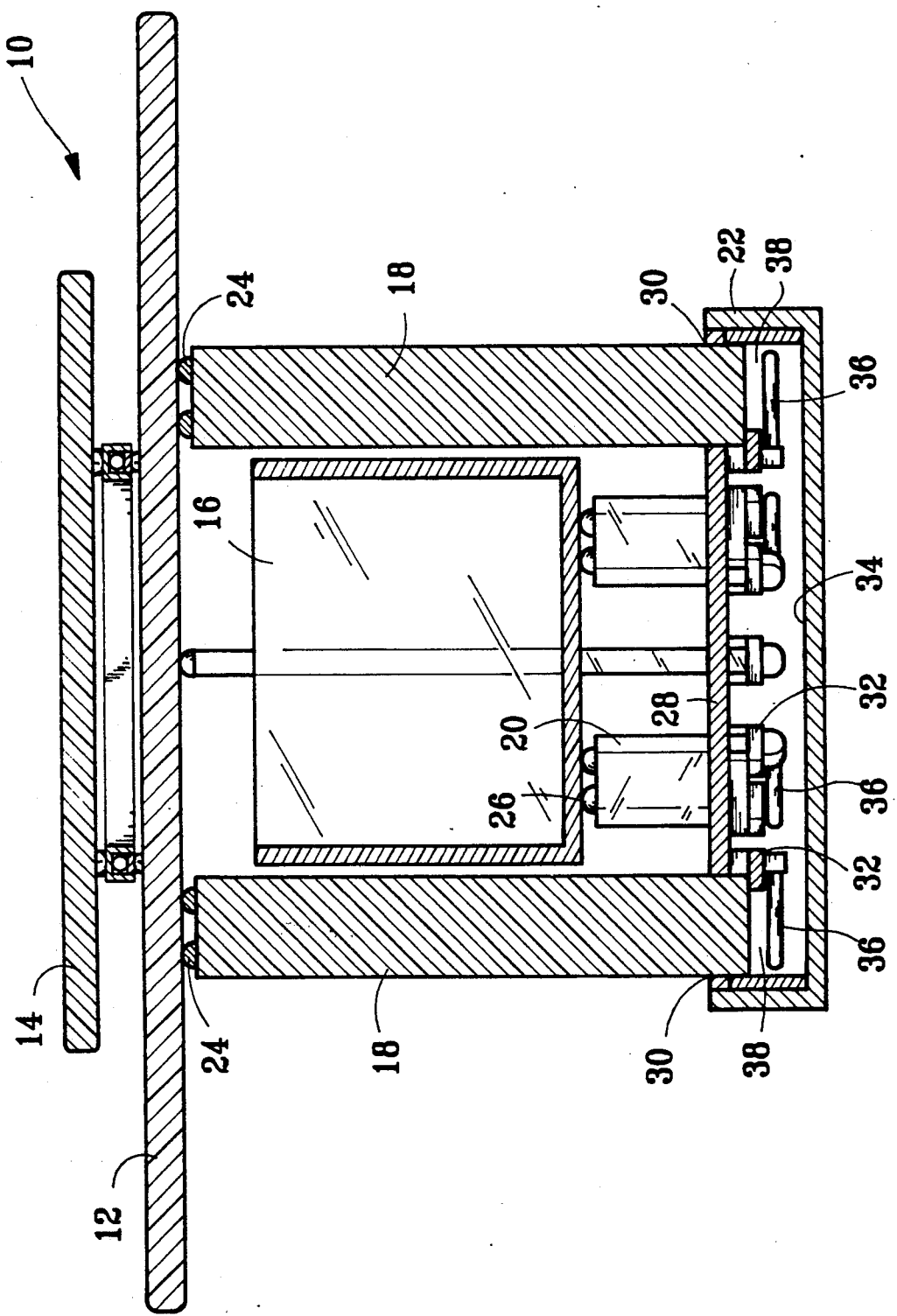
FIG. 3 is a sectional view taken along line 3—3 in FIG. 2.

Please refer to FIG. 3, the base (22) to support the transparent components described above includes an openable top cover (28) with a plurality of slots for fitting of the legs (18) and supports (20). Beneath each slot (30) there is a hollow supporter (32) to support a leg (18) or support (20). After passing through a slot (30), each leg (18) or support (20) is supported by the hollow supporter (32) in a way that the lower end of each leg (18) or support (20) is maintained an adequate distance from a bottom board (34) of the base (22). At the lower end of each hollow supporter (32), a lighting fixture (36), such as fluorescent light or tungsten lamp, is installed. Different lighting fixtures (36) to give different colors and/or intensities are installed in the present invention. The respective light from these lighting fixtures (36) are emitted through the hollow supporters (32) and refracted by the transparent legs (18) and supports (20). Since the legs (18) and the supports (20) are made of transparent material, such as glass, the lights are refracted to the top (12) and the aquarium with the same or different refraction indexes. With such refractions, a variety of color lights, such as red, orange, yellow, green, blue, indigo, and violet, just like a rainbow from each leg (18) or support (20), is seen. Moreover, the lights refracted to the aquarium (16) are refracted by water in the aquarium (16) again, and then reflected from scales on fishes swimming in the aquarium (16). Because the fishes are alive, and swimming continuously in the aquarium (16), there are irregular refraction of lights through the water. Hence, the irregular refraction of lights in the supports (20), the aquarium (16) and water, and the changing reflection of lights from scales of the fishes in the aquarium provide an interesting and wonderful dinning environment.

With a structure described above, people sitting beside the table while dinning can see fishes swimming in the aquarium (16) through the top (12), accompanied by a wonderful light refraction effect at the transparent components and irregularly waving of water in the aquarium (16), as well as an interested reflection of lights from scales on the fishes. Hence, The table with aquarium and light refraction effect according to the present invention can provide a wonderful dinning environment.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A table with decorative aquarium and light refraction effect comprising:

a top made of transparent material;

a plurality of equidistant transparent legs arranged annularly to support the top;

a transparent decorative aquarium below the top, located within a cylindrical zone formed by the said transparent legs;

a plurality of equidistant transparent supports arranged annularly to support the aquarium; and a nontransparent base to support the said legs and supports, having a top cover and a bottom board arranged to provide a space between them, a plurality of slots at the top cover for insertion of the respective legs and supports, a hollow supporter beneath each slot to fit a leg or support, and a lighting fixture installed at the bottom of each hollow supporter whereby light from each light fixture is projected through the hollow supporter to a leg or support, where the light is refracted and then projected to the top and the aquarium.

2. A table with decorative aquarium and light refraction effect as claimed in claim 1 wherein the decorative aquarium is kept adequately apart from the top to permit access of a hand to the aquarium.

* * * * *